3,150,061
INACTIVE DRY YEAST SUITABLE FOR USE IN BREAD DOUGHS
Gaston Dalby, 51 5th Ave., New York, N.Y., and Harry C. Fisher, Cleveland, Ohio, assignors, by mesne assignments, of one-half to Gaston Dalby and one-half to Benj. T. Rauber, both of New York, N.Y.
No Drawing. Filed June 8, 1962, Ser. No. 200,921
5 Claims. (Cl. 195—82)

Our invention relates to an inactive dry yeast suitable for use in bread doughs in levels higher than those heretofore known.

It is known in the art that inactive dry yeast contributes to flavor of bread. This fact is recognized in the bread standards. The inactive dry yeasts heretofore known, however, has a serious deleterious action in the dough. A very small amount can safely be used, about 0.1% on the average. This undesirable action is due to the presence of free glutathione which is liberated from the yeast cell when the cell is killed by heat.

We have discovered and developed a process for the commercial preparation of dry yeast which eliminates this undesirable factor yet preserves the flavor contributing qualities of dry yeast.

When yeast has completed its growth by the usual and well known procedure it is in the form of a slurry or cream. In the manufacture of commercial yeast, the yeast has heretofore been separated from the water in which it has grown by known methods, such as filtering, and then was either packed for sale to the baker or dried for sale as dried yeast. The glutathione remained in the yeast, being within the yeast cells. It can not be dissolved out by water and, if the yeast cells are ruptured to free the glutathione, the desirable part of the yeast dissolves and is lost.

We have discovered a process by means of which the glutathione may be removed from the yeast without also losing the yeast content. In our process, the cream or slurry obtained upon completion of the growth of the yeast is heated, preferably with steam, to just the boiling point of water until the yeast cells are killed. At this point, the glutathione is released from the yeast cells into the water, the contents of the yeast other than the glutathione remaining in the cells.

It is desirable at this point to add cold water to both cool the material and also to dilute the mixture to insure separation of the undesirable materials from the yeast itself. The yeast is then separated by filtering or centrifuging and is then dried. Glutathione may be recovered from the filtrate since it has commercial value in various pharmaceutical products.

The product of our invention is a dry yeast free from significant amounts of glutathione and which may therefore be used in the manufacture of bread in larger amounts than heretofore possible without deleterious effects on the bread.

Having described our invention, we claim:

1. A process of making dried yeast free from significant amounts of glutathione which comprises heating an aqueous culture of yeast to the boiling point of water until the yeast cells are killed, separating the yeast cells from the water and drying the yeast.

2. The process of claim 1 in which the heated culture of yeast is diluted with cold water after killing the yeast cells and prior to separating the cells from the water.

3. The process of claim 1 in which the yeast cells are separated from the aqueous medium by filtering.

4. The process of claim 1 in which the yeast cells are separated from the aqueous medium by centrifuging.

5. An inactive dried yeast product free from significant amounts of glutathione.

References Cited in the file of this patent
UNITED STATES PATENTS
2,710,810    Strashun _____ June 14, 1955

OTHER REFERENCES
Cook: The Chemistry and Biology of Yeasts, Academic Press, Inc., New York, 1958. Pages 557–558 and 613. Copy in Division 63, QR151C6C2.